(12) United States Patent
Cho

(10) Patent No.: US 10,615,718 B2
(45) Date of Patent: Apr. 7, 2020

(54) INVERTER CONTROLLING DEVICE MAXIMIZING OUTPUT VOLTAGE OF INVERTER IN OVERMODULATION PERIOD

(71) Applicant: LSIS CO., LTD., Anyang-si, Gyeonggi-do (KR)

(72) Inventor: Byung-Geuk Cho, Anyang-si (KR)

(73) Assignee: LSIS CO., LTD., Anyang-si, Gyeonggi-Do (KR)

(*) Notice: Subject to any disclaimer, the term of this patent is extended or adjusted under 35 U.S.C. 154(b) by 0 days.

(21) Appl. No.: 16/299,932

(22) Filed: Mar. 12, 2019

(65) Prior Publication Data
US 2019/0372480 A1 Dec. 5, 2019

(30) Foreign Application Priority Data
May 31, 2018 (KR) .................. 10-2018-0062313

(51) Int. Cl.
*H02M 7/5395* (2006.01)
*H02P 27/08* (2006.01)

(52) U.S. Cl.
CPC .......... *H02M 7/5395* (2013.01); *H02P 27/08* (2013.01)

(58) Field of Classification Search
CPC ........ H02M 1/12; H02M 1/42; H02M 1/4266; H02M 1/14; H02M 2001/123; H02M 7/5395; H02M 7/527
See application file for complete search history.

(56) References Cited

U.S. PATENT DOCUMENTS

| 7,518,893 B2* | 4/2009 | Ponnaluri | H02M 1/12 363/163 |
| 7,778,052 B2* | 8/2010 | Serpa | H02M 1/12 363/40 |

(Continued)

FOREIGN PATENT DOCUMENTS

| KR | 20100028968 A | 3/2010 |
| KR | 20120079978 A | 7/2012 |
| KR | 101200815 B1 | 11/2012 |

OTHER PUBLICATIONS

Korean Office Action for related Korean Application No. 10-2018-0062313; dated Jul. 30, 2019; (5 pages).

(Continued)

*Primary Examiner* — Kyle J Moody
*Assistant Examiner* — Nusrat Quddus
(74) *Attorney, Agent, or Firm* — K&L Gates LLP

(57) ABSTRACT

The inverter includes an inverting module including a plurality of switching elements, wherein the inverting module are configured for receiving a direct current (DC) stage voltage and for generating an output voltage of three-phases via switching of the switching elements. The device includes: a command voltage outputting unit configured for providing a pulse width modulation (PWM) control signal corresponding to an initial command voltage to the switching elements of the inverting module when the initial command voltage is within a voltage limit; a modulation index modifying unit configured for modifying a modulation index of the initial command voltage when the initial command voltage is outside the voltage limit; and an overmodulated command voltage generation unit configured for modifying the initial command voltage using the modified modulation index to form a modified command voltage and (Continued)

for limiting the modified command voltage to the voltage limit to generate an overmodulated command voltage.

7 Claims, 13 Drawing Sheets

(56) References Cited

U.S. PATENT DOCUMENTS

| | | | | |
|---|---|---|---|---|
| 8,553,434 | B2* | 10/2013 | Coccia | H02J 3/01 |
| | | | | 363/40 |
| 2007/0091653 | A1* | 4/2007 | Leggate | H02M 7/53875 |
| | | | | 363/41 |
| 2007/0121354 | A1* | 5/2007 | Jones | H02M 5/4585 |
| | | | | 363/47 |
| 2009/0251933 | A1* | 10/2009 | Angerer | H02J 3/38 |
| | | | | 363/71 |

OTHER PUBLICATIONS

European Search Report for related European Application No. 19162677.9; dated Oct. 16, 2019; (7 pages).
Hava, et al.; "Dynamic Overmodulation Characteristics of Triangle Intersection PWM Methods"; IEEE Transactions on Industry Applications; vol. 35, No. 4; Jul./Aug. 1999; (12 pages).
Hava, et al; Carrier-Based PWM-VSI Overmodulation Strategies: Analysis, Comparison, and Design; IEEE Transactions on Power Electronics; vol. 13, No. 4; Jul. 1998; (16 pages).

\* cited by examiner

PRIOR ART

PRIOR ART

PRIOR ART

PRIOR ART

PRIOR ART

PRIOR ART

PRIOR ART

PRIOR ART

PRIOR ART

INVERTER CONTROLLING DEVICE MAXIMIZING OUTPUT VOLTAGE OF INVERTER IN OVERMODULATION PERIOD

CROSS-REFERENCE TO RELATED APPLICATION

Pursuant to 35 U.S.C. § 119(a), this application claims the benefit of earlier filing date and right of priority to Korean Application No. 10-2018-0062313, filed on May 31, 2018, in the Korean Intellectual Property Office, the disclosure of which is incorporated herein in its entirety by reference.

TECHNICAL FIELD

The present disclosure relates to a device for controlling an inverter.

BACKGROUND

Generally, an inverter is a device that electrically converts a direct current (DC) to an alternate current (AC). An inverter used in the industry is defined as a series of devices that control a motor speed such that the motor be used with a high efficiency by varying a voltage and frequency of power supplied from a commercial power supply and injecting the varied power to the motor. Since the inverter may control a magnitude and frequency of AC voltage, the inverter has been widely used in systems requiring variable speed operations.

In a motor drive system to which the inverter is applied, when an input power to the inverter decreases due to an accident or the like, a magnitude of an inverter output current varies depending on a voltage synthesis performance of the inverter. Under a assumption of the same load, a magnitude of an output current decreases as a magnitude of an output voltage increases. Thus, the system loss may be reduced and a current fault may be prevented. As a result, studies have been actively made on an overmodulation scheme that can increase the output voltage of the inverter relative to a reduced input voltage.

The inverter overmodulation scheme may be divided into a dynamic overmodulation scheme and a static overmodulation scheme. The dynamic overmodulation scheme is mainly applied to vector control for instantaneous control. The static overmodulation scheme such as a V/f control scheme of an induction motor is mainly applied to a steady state operation.

For a conventional static overmodulation, when the output voltage of the inverter is increased, linearity cannot be secured in a region where a modulation index is equal to or larger than a predetermined value. The linearity means a property of synthesizing the same output voltage as a command voltage. When the linearity is not guaranteed, there is a problem that an output voltage smaller than the command voltage occurs in an overmodulation region. As a result, a driving of the load is limited.

SUMMARY

In order to solve the problem, a purpose of the present disclosure is to provide an inverter-controlling device that maximizes an output voltage of the inverter in a overmodulation period and extends a region of the linearity between the command voltage and output voltage.

In one aspect of the present disclosure, there is provided a device for controlling an inverter, wherein the device is configured for controlling an output of the inverter in an overmodulation region, wherein the inverter includes an inverting module including a plurality of switching elements, wherein the inverting module are configured for receiving a direct current (DC) stage voltage and for generating an output voltage of three-phases via switching of the switching elements, wherein the device includes: a command voltage outputting unit configured for providing a pulse width modulation (PWM) control signal corresponding to an initial command voltage to the switching elements of the inverting module when the initial command voltage is within a voltage limit; a modulation index modifying unit configured for modifying a modulation index of the initial command voltage when the initial command voltage is outside the voltage limit; and an overmodulated command voltage generation unit configured for modifying the initial command voltage using the modified modulation index to form a modified command voltage and for limiting the modified command voltage to the voltage limit to generate an overmodulated command voltage, wherein when the initial command voltage is outside the voltage limit, the command voltage outputting unit is configured for injecting a PWM control signal corresponding to the overmodulated command voltage to the switching elements of the inverting module.

In one implementation, the modulation index modifying unit is further configured for modifying the modulation index of the initial command voltage such that a modulation index of an output voltage of the inverting module outputted based on the PWM control signal corresponding to the overmodulated command voltage has a linear relationship with a modulation index of the overmodulated command voltage.

In one implementation, the modified command voltage is determined using the following Equation 1:

$$m = \frac{|V^*|}{\frac{2}{\pi}V_{dc}} \quad \text{[Equation 1]}$$

$$_{-}|V_m^*| = m \times \left(\frac{2}{\pi}V_{dc}\right)$$

where m indicates the modulation index of the modified command voltage, $V_{dc}$ indicates the DC stage voltage, and $V_m^*$ indicates the modified command voltage.

In one implementation, the overmodulated command voltage generation unit is further configured for generating the overmodulated command voltage from the modified command voltage outside the voltage limit so as to maintain a PWM switching state of the inverting module.

In one implementation, the overmodulated command voltage generation unit is further configured for generating the overmodulated command voltage by: when a difference between a maximum value and a median value among modified command voltages of three-phases is greater than a difference between the median value and a minimum value among the modified command voltages of three-phases, determining the maximum value as a positive DC stage voltage; or when the difference between the maximum value and the median value among the modified command voltages of three-phases is smaller than or equal to a difference between the median value and the minimum value, determining the minimum value as a negative DC stage voltage.

In one implementation, the modulation index modifying unit is further configured for modifying the modulation index of the initial command voltage in accordance with a following Table 1:

TABLE 1

| Modulation index of initial command voltage | Modulation index of modified command voltage |
|---|---|
| 0.9067 | 0.9067 |
| 0.9233 | 0.9291 |
| 0.9317 | 0.9440 |
| 0.9402 | 0.9621 |
| 0.9487 | 0.9833 |
| 0.9548 | 1.001 |
| 0.959 | 1.016 |
| 0.9655 | 1.041 |
| 0.9704 | 1.063 |
| 0.9756 | 1.092 |
| 0.9797 | 1.119 |
| 0.9836 | 1.151 |
| 0.9869 | 1.182 |
| 0.9895 | 1.214 |
| 0.9915 | 1.242 |
| 0.9932 | 1.274 |
| 0.995 | 1.312 |
| 0.996 | 1.341 |
| 0.997 | 1.375 |
| 0.9977 | 1.406 |
| 0.9981 | 1.423 |
| 0.9984 | 1.443 |
| 0.9988 | 1.473 |
| 0.9991 | 1.500 |
| 0.9993 | 1.521 |
| 0.9995 | 1.548 |
| 0.9996 | 1.574 |
| 0.9997 | 1.592 |
| 0.9998 | 1.627 |
| 0.9999 | 1.635 |
| 1 | 1.7 |

In one implementation, the voltage limit defines a maximum voltage that the inverting module can output based on a magnitude of an input power to the inverter.

In one implementation, a line corresponding to the voltage limit defines a hexagonal shape.

The control device in accordance with the present disclosure as described above modifies the modulation index of the initial command voltage based on the switching state-maintained overmodulation scheme and generates the overmodulated command voltage by overmodulating the modified command voltage corresponding to the modified modulation index, thereby to secure the linearity between the inverter output voltage and the command voltage.

Further specific effects of the present disclosure as well as the effects as described above will be described in conduction with illustrations of specific details for carrying out the invention.

DETAILED DESCRIPTION

Figure 1:
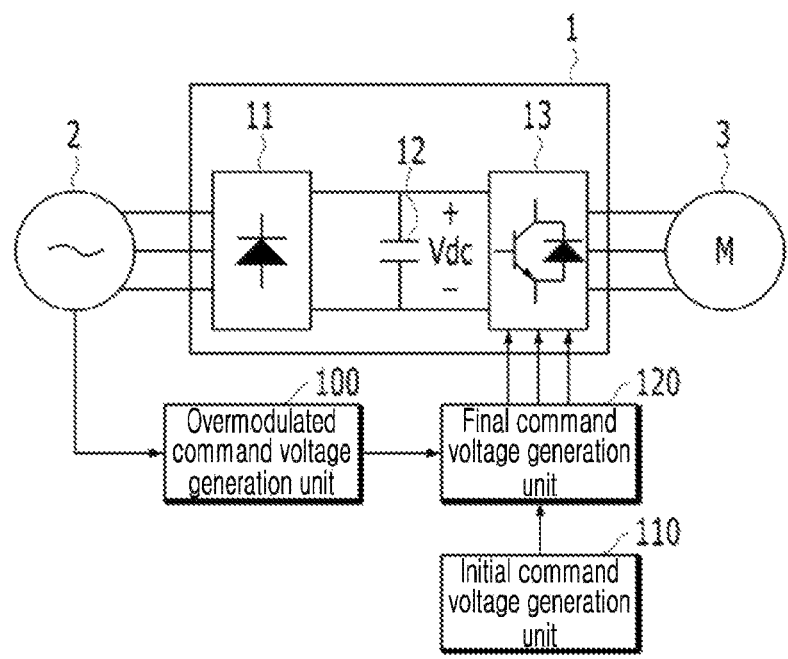
FIG. 1 illustrates a conventional device for controlling an inverter system for overmodulation control.

Hereinafter, a device for controlling an inverter in accordance with the present disclosure will be described with reference to the accompanying drawings.

For simplicity and clarity of illustration, elements in the figures, are not necessarily drawn to scale. The same reference numbers in different figures, denote the same or similar elements, and as such perform similar functionality. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

The above objects, features and advantages will become apparent from the detailed description with reference to the accompanying drawings. Embodiments are described in sufficient detail to enable those skilled in the art in the art to easily practice the technical idea of the present disclosure. Detailed descriptions of well-known functions or configurations may be omitted in order not to unnecessarily obscure the gist of the present disclosure. Hereinafter, embodiments of the present disclosure will be described in detail with reference to the accompanying drawings. Throughout the drawings, like reference numerals refer to like elements.

Unless defined otherwise, all terms used herein have the same meaning as commonly understood by one of ordinary skill in the art. When the terms used herein are in conflict with a general meaning of the term, the meaning of the term is in accordance with a definition used herein.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

In addition, it will also be understood that when a first element or layer is referred to as being present "on" a second element or layer, the first element may be disposed directly on the second element or may be disposed indirectly on the second element with a third element or layer being disposed between the first and second elements or layers. It will be understood that when an element or layer is referred to as being "connected to", or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

FIG. 1 illustrates a conventional device for controlling an inverter system for overmodulation control.

In general, an inverter 1 includes a rectifying module 11, a smoothing module 12, and an inverting module 13. The rectifying module 11 receives an AC power of 3 phases from a power supply 2 and rectifies the power into the DC power. The smoothing module 12 smoothens a DC voltage from the rectifying module 11 and stores the smoothed DC voltage as a DC link voltage.

The inverting module 13 may convert the DC link voltage stored in the smoothing module 12 into an AC voltage having a predetermined voltage and frequency based on a PWM control signal and may output the AC voltage to the motor 3. The inverting module 13 may be composed of 3 legs corresponding to 3 phases respectively. Each leg has two switching elements connected in series. In the inverting module 13, the switching elements of each leg of each phase may be configured in various topologies.

In this connection, a command voltage is applied to the inverting module 13 to drive the motor 3. In this connection, a maximum magnitude of a voltage that can be output may be limited (that is, a voltage limit) depending on a magnitude of the input power from the power supply 2. When the command voltage generated by an initial command voltage generation unit 110 becomes larger than the above-mentioned voltage limit, the inverter 1 operates in the overmodulation region. When the overmodulation does not occur, the initial command voltage from the initial command voltage generation unit 110 becomes a final command voltage. In the overmodulation situation, a command voltage from an overmodulated command voltage generation unit 100 becomes the final command voltage.

Accordingly, the final command voltage generation unit 120 selects the initial command voltage or the overmodulated command voltage depending on presence or absence of the overmodulation. Then, the unit 120 generates a pulse width modulation (PWM) control signal corresponding to the final command voltage as the selected command voltage and delivers the generated signal to the inverting module 13.

When three-phase command voltages from the initial command voltage generation unit 110 are defined as $V_{as}^*$, $V_{bs}$, and $V_{cs}^*$ respectively, stationary reference frame-based command voltages $V_{ds}^{s*}$ and $V_{gs}^{s*}$ may be defined as a following coordinate transformation formula:

$$\begin{bmatrix} V_{ds}^{s*} \\ V_{qs}^{s*} \end{bmatrix} = \frac{2}{3} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} V_{as}^* \\ V_{bs}^* \\ V_{vs}^* \end{bmatrix} \quad \text{[Equation 1]}$$

Figure 2:
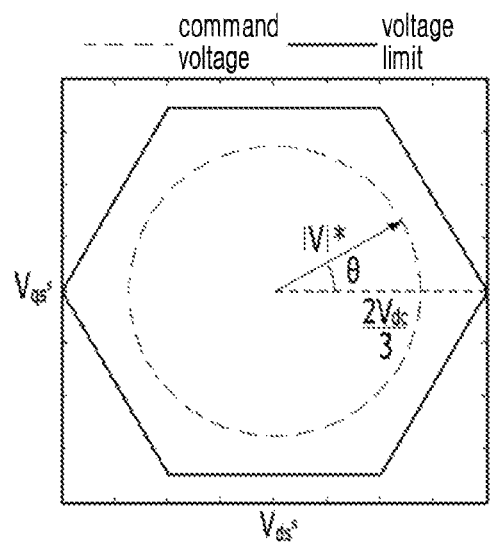
FIG. 2 and FIG. 3 illustrate a relationship between an inverter voltage limit and a command voltage.
Figure 3:
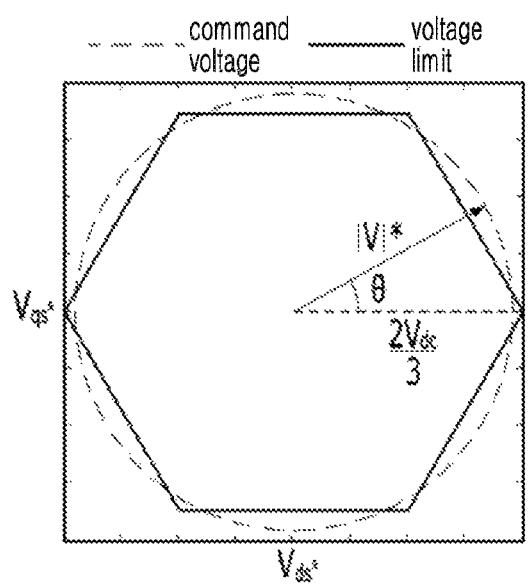

On a plane composed of these stationary reference frame voltages, a maximum magnitude or limit of the voltage that inverter 1 can output based on $V_{ds}^{s*}$, $V_{qs}^{s*}$, and the DC link voltage $V_{dc}$ may be shown as in FIG. 2 and FIG. 3. FIG. 2 and FIG. 3 are examples for illustrating the relationship between the inverter voltage limit and command voltage.

In FIG. 2, a magnitude of a DC stage voltage of the inverter 1 is sufficiently larger than a magnitude of the command voltage, the command voltage is within the voltage limit. In FIG. 3, the DC stage voltage decreases due to a decrease in the input power 2 and the magnitude of the voltage limit decreases, or the command voltage increases, such that the command voltage is outside the voltage limit and thus the overmodulation region occurs.

Such an overmodulation generation condition may be expressed using a modulation index m of the inverter. The modulation index m may be defined as follows:

$$m = \frac{|V^*|}{\frac{2}{\pi} V_{dc}} \quad \text{[Equation 2]}$$

In this connection, when a 6-steps operation is applied in which the inverter applies can synthesize the maximum voltage, the modulation index m has a maximum value of 1. Based on FIG. 2 and FIG. 3 and the definition of Equation 2, it may be confirmed that a moment at which the overmodulation starts corresponds to a when the magnitude of the command voltage is $$\frac{V_{dc}}{\sqrt{3}}.$$

In this connection, the modulation index m is 0.9067. Therefore, in a region where the index m is larger than 0.9067, the overmodulation phenomenon as shown in FIG. 3 occurs.

There is a smallest-distance-based overmodulation scheme, which is known to be the most widely used overmodulation scheme in the industry. According to this smallest-distance-based overmodulation scheme, a command voltage is modified to minimize a difference between an initial command voltage V* outside the voltage limit and a command voltage $V_{new}^*$ after overmodulation and at the voltage limit.

Figure 4:
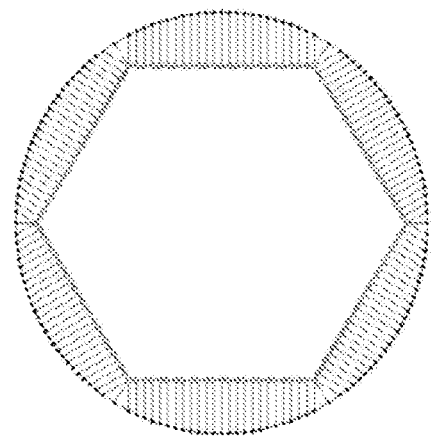
FIG. 4 is an example for illustrating modifying a command voltage beyond the voltage limit onto the voltage limit.

FIG. 4 is an example to illustrate modifying the command voltage beyond the voltage limit onto the voltage limit. The modifying of the command voltage in FIG. 4 may be expressed using following Equations. The difference between the command voltages may be expressed as Equation 3. In this connection, applying, to the Equation 3, a three-phase equilibrium condition according to Equation 4 and an overmodulation condition according to Equation 5 may result in Equation 6:

$$|V_{new}^* - V^*| = (V_{new\_max}^* - V_{max}^*)^2 + \\ (V_{new\_mid}^* - V_{mid}^*)^2 + (V_{new\_min}^* - V_{min}^*)^2$$ [Equation 3]

$$\begin{cases} V_{new\_mid}^* = -(V_{new\_max}^* + V_{new\_min}^*) \\ V_{mid}^* = -(V_{max}^* + V_{min}^*) \end{cases}$$ [Equation 4]

$$V_{new\_min}^* = V_{new\_max}^* - V_{dc}$$ [Equation 5]

$$\begin{cases} V_{new\_max}^* = \dfrac{V_{max}^* + V_{min}^* + V_{dc}}{2} \\ V_{new\_min}^* = \dfrac{V_{max}^* + V_{min}^* - V_{dc}}{2} \\ V_{new\_mid}^* = -(V_{new\_max}^* + V_{new\_min}^*) = V_{mid}^* \end{cases}$$ [Equation 6]

The stationary reference frame-based command voltages in Equation 6 may be rewritten into three-phases command voltages as in Equation 7. A bound function of Equation 7 may be defined as Equation 8:

$$V_{new\_as}^* = \text{bound}\left(-\dfrac{V_{dc}}{2}, \dfrac{V_{dc}}{2}, V_{as}^* - \dfrac{V_{max}^* + V_{min}^*}{2}\right)$$ [Equation 7]

$$V_{new\_bs}^* = \text{bound}\left(-\dfrac{V_{dc}}{2}, \dfrac{V_{dc}}{2}, V_{bs}^* - \dfrac{V_{max}^* + V_{min}^*}{2}\right)$$

$$V_{new\_cs}^* = \text{bound}\left(-\dfrac{V_{dc}}{2}, \dfrac{V_{dc}}{2}, V_{cs}^* - \dfrac{V_{max}^* + V_{min}^*}{2}\right)$$

$$\text{bound}(a, b, x) = \begin{cases} a & (\text{if } x < a) \\ b & (\text{if } x < b) \\ x & (\text{if } a \le x < b) \end{cases}$$ [Equation 8]

Figure 5:
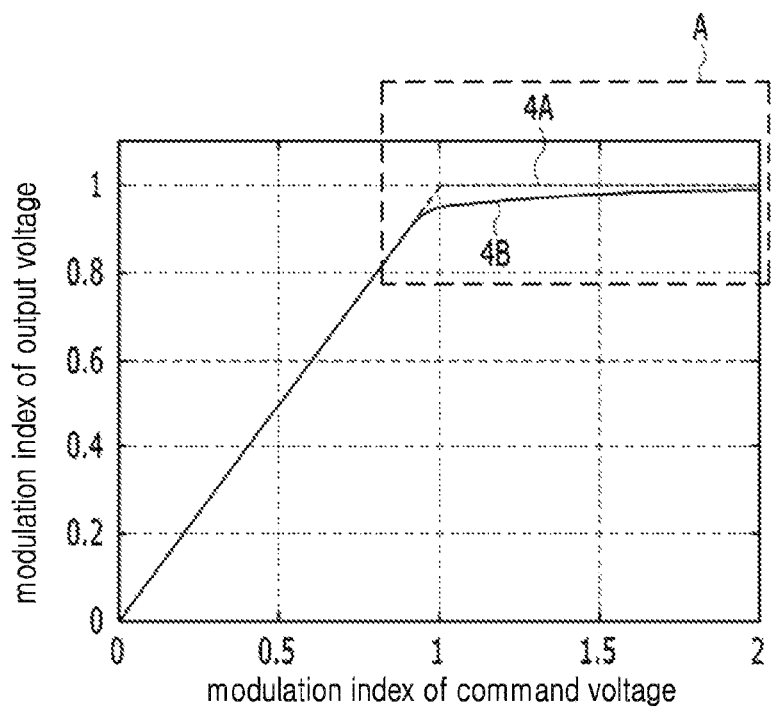
FIG. 5 and FIG. 6 show example graphs of a relationship between an inverter output voltage modulation index and an command voltage modulation index in a smallest-distance-based overmodulation scheme.
Figure 6:
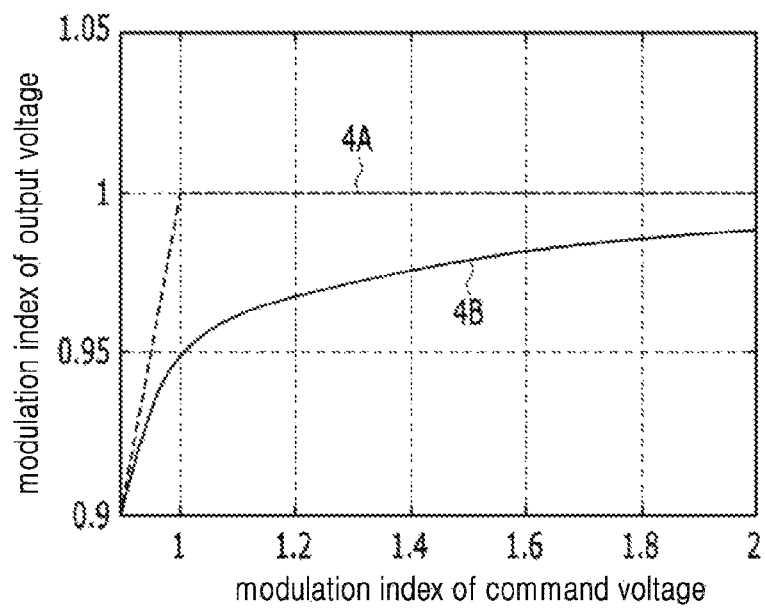

A relationship between the modulation index of the output voltage and the modulation index of the command voltage based on the smallest-distance overmodulation scheme may be shown in FIG. 5 and FIG. 6. FIG. 5 and FIG. 6 show example graphs of the relationship between the modulation index of the output voltage and the modulation index of the command voltage based on the smallest-distance overmodulation scheme. FIG. 6 is an enlarged view of an area A in FIG. 5.

In FIG. 5 and FIG. 6, 4A refers to a baseline indicating a linearity, and 4B refers to a performance of the smallest-distance overmodulation. Referring to FIG. 6, it may be seen that the linearity disappears when the command voltage modulation index is greater than about 0.9067.

As another overmodulation scheme, a switching state-maintaining overmodulation scheme may be set forth. This scheme may maintain a pulse width modulation (PWM) switching state of the inverter to a maximum extent for an initial command voltage V* outside the voltage limit.

Figure 7:
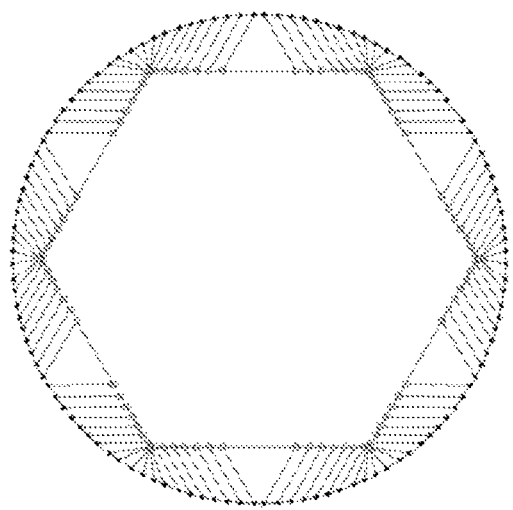
FIG. 7 is an example for illustrating a switching state-maintaining overmodulation scheme.

FIG. 7 is an example for illustrating the switching state-maintaining overmodulation scheme. FIG. 7 shows a trace of the command voltage resulting from the switching state-maintaining overmodulation. As shown in FIG. 7, it may be seen that the trace of the command voltage resulting from the switching state-maintaining overmodulation is different from the trace of the command voltage resulting from the above-described smallest-distance overmodulation.

When a difference between a maximum value and a median value among the three-phases command voltages is greater than a difference between the median value and a minimum value among the three-phases command voltages, the maximum value is defined as a positive DC stage voltage. Thus, the switching state may be maintained to a maximum extent.

To the contrary, when a difference between a maximum value and a median value among the three-phases command voltages is smaller than or equal to a difference between the median value and a minimum value among the three-phases command voltages, the minimum value is defined as a negative DC stage voltage. Thus, the switching state may be maintained to a maximum extent.

Such switching state-maintaining overmodulation scheme may be equivalent to Equation 9 and Equation 10 as follows:

$$\begin{cases} V_{max}^* + V_{shift} = \dfrac{V_{dc}}{2} & (if, V_{max}^* - V_{mid}^* > V_{mid}^* - V_{min}^*) \\ V_{min}^* + V_{shift} = -\dfrac{V_{dc}}{2} & (if, V_{max}^* - V_{mid}^* \le V_{mid}^* - V_{min}^*) \end{cases}$$ [Equation 9]

$$V_{new\_as}^* = \text{bound}\left(-\dfrac{V_{dc}}{2}, \dfrac{V_{dc}}{2}, V_{as}^* - V_{shift}\right)$$ [Equation 10]

$$V_{new\_bs}^* = \text{bound}\left(-\dfrac{V_{dc}}{2}, \dfrac{V_{dc}}{2}, V_{bs}^* - V_{shift}\right)$$

$$V_{new\_cs}^* = \text{bound}\left(-\dfrac{V_{dc}}{2}, \dfrac{V_{dc}}{2}, V_{cs}^* - V_{shift}\right)$$

$V_{shift}$ as defined in Equation 9 and Equation 10 refers to a value added for the PWM switching. This value indicates that, for each phase, the command voltage is modified and overmodulated.

Figure 8:
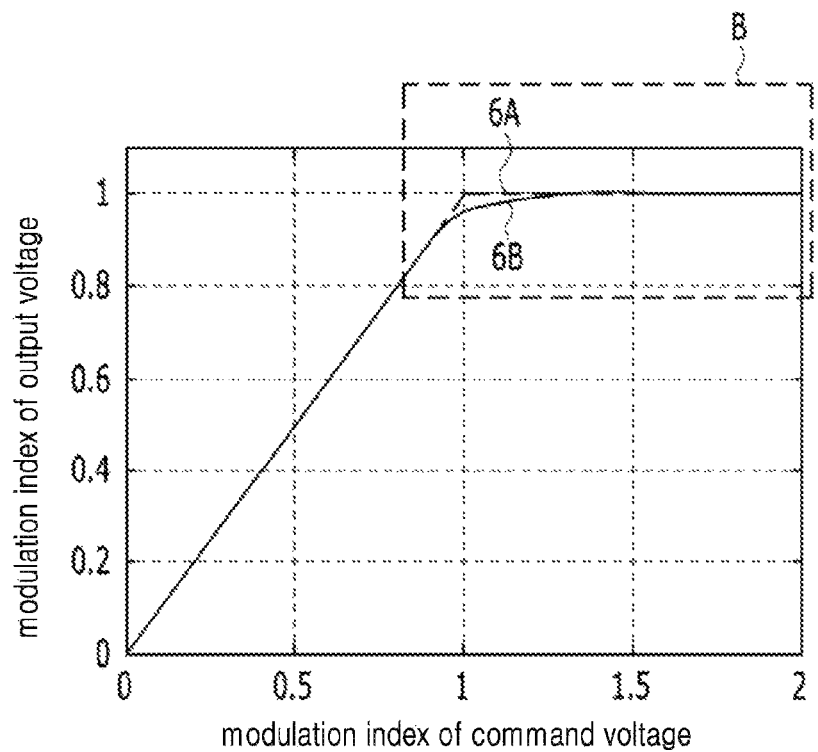
FIG. 8 and FIG. 9 are example graphs for illustrating a relationship between the command voltage modulation index and the inverter output voltage modulation index in the switching state-maintaining overmodulation scheme.
Figure 9:
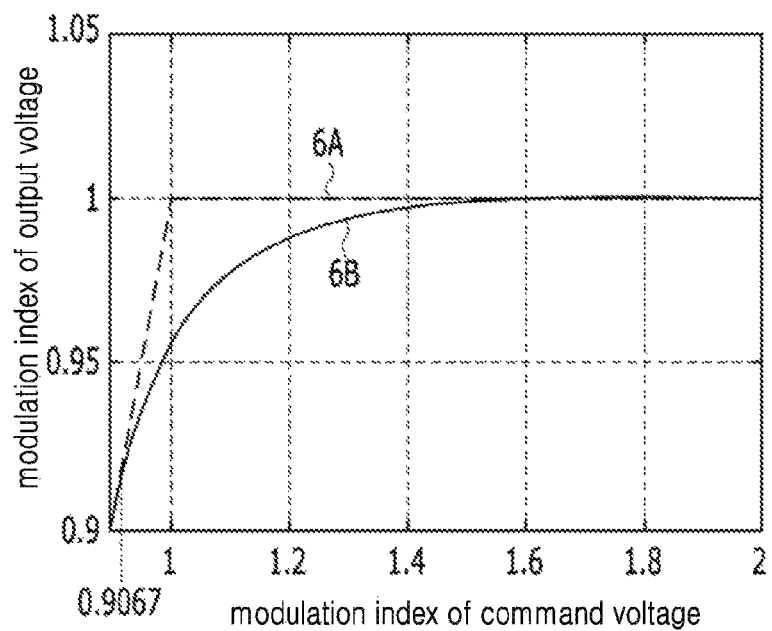

FIG. 8 and FIG. 9 are illustrative graphs showing a relationship between the command voltage modulation index and the inverter output voltage modulation index in the switching state-maintaining overmodulation scheme. FIG. 9 shows an enlarged view of an area B in FIG. 8.

In FIG. 8 and FIG. 9, 6A represents a baseline indicating a linearity and 6B represents a performance of the switching state-maintaining overmodulation scheme. It may be seen that the linearity disappears after about 0.9067, which is similar to the smallest-distance overmodulation scheme in FIG. 4.

According to the conventional overmodulation scheme, the linearity is not ensured in the region where the modulation index of the command voltage is larger than 0.9067. This is because when the command voltage exceeds the voltage limit, the command voltage is instantaneously modified to compensates for the difference between the command voltage and the voltage limit, such that there occurs always a difference between the command voltage and output voltage on a single period basis. That is, since the modulation index, which can be achieved by the inverter 1 at a maximum level, cannot be 1, the linearity cannot be secured.

The present disclosure is intended to solve the problems of the conventional overmodulation scheme. According to the present disclosure, there is provided an inverter-controlling device that maximizes the inverter output voltage in the overmodulation region and extends the region of the linearity between the command voltage and the output voltage. The inverter-controlling device according to the present disclosure generates an overmodulated command voltage by modifying the switching state-maintaining overmodulation scheme on a single period basis, unlike the conventional scheme that instantaneously modifies the command voltage.

Figure 10:
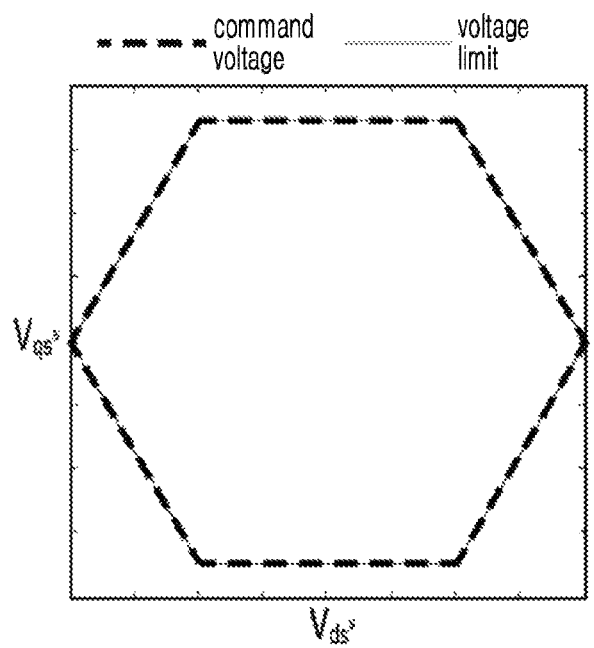
FIG. 10 and FIG. 11 are examples for illustrating generation of an overmodulated command voltage according to one embodiment of the present disclosure.
Figure 11:
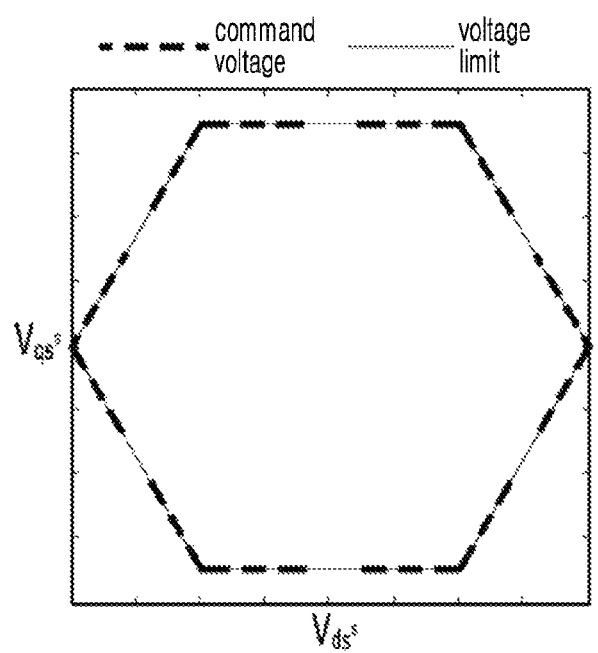

FIG. 10 and FIG. 11 illustrate an example of generation of an overmodulated command voltage according to one embodiment of the present disclosure. FIG. 10 shows a command voltage trace in a smallest-distance based overmodulation scheme. FIG. 11 shows a command voltage trace in a switching state-maintaining based overmodulation scheme. In FIG. 10 and FIG. 11, a solid line represents the voltage limit and the dotted line represents the command voltage.

Referring to FIG. 10, for the smallest-distance based overmodulation scheme, even when the modulation index of the command voltage increases to infinity, the command voltage varies along a hexagonal line as the voltage limit. Thus, the 6-steps operation, which may output the maximum voltage of the inverter may not be achieved. The six-steps operation of the inverter is to allow presence of six equal switching regions in a single period of the output in a three-phase inverter. When the 6-steps operation is realized, the inverter maximum voltage is output.

In the switching state-maintaining overmodulation scheme, as shown in FIG. 7 and FIG. 11, discontinuous command voltages may be generated in the overmodulation state. This scheme may modify the command voltage to 6 vertices of the voltage limiting hexagon, so that the 6 step operation becomes possible.

Thus, the inverter-controlling device in accordance with an embodiment of the present disclosure may employ a modification of the conventional switching state-maintaining overmodulation scheme to ensure the linearity in the overmodulation region using the characteristics of switching state-maintaining overmodulation.

Figure 12:
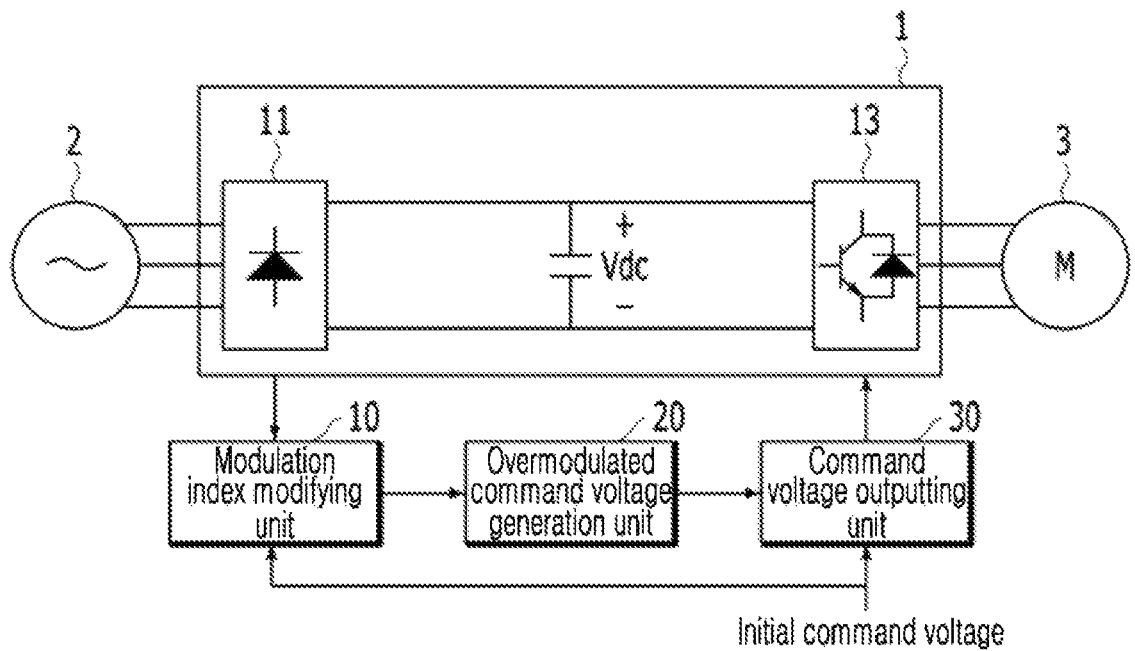
FIG. 12 is a schematic diagram illustrating an inverter-controlling device in accordance with an embodiment of the present disclosure.

FIG. 12 is a schematic diagram for illustrating an inverter-controlling device in accordance with an embodiment of the present disclosure.

As shown FIG. 12, a control device according to one embodiment of the present disclosure is configured for controlling the inverter 1. The control device may include a modulation index modifying unit 10, an overmodulated command voltage generation unit 20, and a command voltage outputting unit 30.

The inverter 1 includes a rectifying module 11, a smoothing module 12, and an inverting module 13. The rectifying module 11 receives an AC power of 3 phases from a power supply 2 and rectifies the power into the DC power. The smoothing module 12 smoothens a DC voltage from the rectifying module 11 and stores the smoothed DC voltage as a DC link voltage.

The inverting module 13 may convert the DC link voltage stored in the smoothing module 12 into an AC voltage having a predetermined voltage and frequency based on a PWM control signal and may output the AC voltage to the motor 3. The inverting module 13 may be composed of 3 legs corresponding to 3 phases respectively. Each leg has two switching elements connected in series. In the inverting module 13, the switching elements of each leg of each phase may be configured in various topologies.

In this connection, a command voltage is applied to the inverting module 13 to drive the motor 3. In this connection, a maximum magnitude of a voltage that can be output may be limited (that is, a voltage limit) depending on a magnitude of the input power from the power supply 2. The command voltage outputting unit 30 receives the command voltage from a higher level controller (not shown). When the command voltage is within the voltage limit, that is, when the modulation index is 0.9067 or lower, the command voltage outputting unit 30 may output a pulse width modulation (PWM) control signal corresponding to the command voltage to the inverter 1. The inverting module 13 in the inverter 1 may perform switching operations according to the PWM control signal as received from the command voltage outputting unit 30 and thus output the AC voltage to the motor 3.

When the command voltage provided from the higher level controller (not shown) is outside the voltage limit, i.e., when the modulation index is greater than 0.9067, the inverter 1 operates in the overmodulation region.

For example, it may be assumed that the modulation index of the initial command voltage is 0.95. The modulation index may be calculated using $$m = \frac{|V^*|}{\frac{2}{\pi}V_{dc}}.$$

The modulation index may be calculated using a magnitude of the initial command voltage and a magnitude of the DC stage voltage of the inverter 1.

Referring to FIG. 9, in this case, the switching state-maintaining overmodulation performance has the output voltage modulation index of 0.935, which is about 0.015 smaller than the modulation index 0.95 of the command voltage. That is, since the modulation index of the output voltage is not the same as the modulation index of the command voltage, the linearity is not obtained. When the actual command voltage having the modulation index of 0.95 is not applied but a virtual command voltage with a modulation index of 0.989 is applied, the modulation index of the output voltage of the inverter 1 is 0.95. Thus, the linearity between the modulation index of the output voltage and the modulation index of the command voltage is ensured.

That is, when the modulation index of the command voltage is 0.95, the output voltage modulation index of the inverter is 0.95. Thus, the linearity is secured. To this end, according to one embodiment of the present disclosure, the modulation index of the command voltage may be modified to 0.989 instead of 0.95 and a new command voltage with the modified modulation index may be provided to the inverter. As a result, the modulation index of the output voltage is 0.95, which matches the modulation index of the actual command voltage.

That is, the modulation index modifying unit 10 according to an embodiment of the present disclosure may modify a modulation index of an initial command voltage and output a virtual modified command voltage modulation index. To this end, the modulation index modifying unit 10 may store a modified modulation index table for linearly outputting a modulation index of the output voltage relative to an modulation index of an input initial command voltage. Table 1 is an example of a modified modulation index table.

TABLE 1

| Initial command voltage modulation index | Modified command voltage modulation index |
|---|---|
| 0.9067 | 0.9067 |
| 0.9233 | 0.9291 |
| 0.9317 | 0.9440 |
| 0.9402 | 0.9621 |
| 0.9487 | 0.9833 |
| 0.9548 | 1.001 |
| 0.959 | 1.016 |
| 0.9655 | 1.041 |
| 0.9704 | 1.063 |
| 0.9756 | 1.092 |
| 0.9797 | 1.119 |
| 0.9836 | 1.151 |
| 0.9869 | 1.182 |
| 0.9895 | 1.214 |
| 0.9915 | 1.242 |
| 0.9932 | 1.274 |
| 0.995 | 1.312 |
| 0.996 | 1.341 |
| 0.997 | 1.375 |
| 0.9977 | 1.406 |
| 0.9981 | 1.423 |
| 0.9984 | 1.443 |
| 0.9988 | 1.473 |
| 0.9991 | 1.500 |
| 0.9993 | 1.521 |
| 0.9995 | 1.548 |
| 0.9996 | 1.574 |
| 0.9997 | 1.592 |
| 0.9998 | 1.627 |
| 0.9999 | 1.635 |
| 1 | 1.7 |

In the Table 1, 31 points were selected for implementation. However, the present disclosure is not limited thereto. Any points between the upper and lower limits may be appropriately selected.

When the modulation index of the initial command voltage is modified by the modulation index modifying unit 10, a magnitude of the command voltage may be modified using the above Equation 2.

The overmodulated command voltage generation unit 20 may use the magnitude of the modified command voltage to generate an overmodulated command voltage so that the modulated command voltage is limited within the voltage limit. That is, when a difference between a maximum value and a median value among the modified 3 phases command voltages is greater than a difference between the median value and a minimum value among the modified 3 phases command voltages, the maximum value is determined as the positive DC stage voltage. Thus, the switching state may be maintained to the maximum extent. To the contrary, when a difference between a maximum value and a median value among the modified 3 phases command voltages is smaller than or equal to a difference between the median value and a minimum value among the modified 3 phases command voltages, the minimum value is determined as the negative DC stage voltage. Thus, the switching state may be maintained to the maximum extent.

However, the overmodulated command voltage generation by the overmodulated command voltage generation unit 20 in accordance with the present disclosure is not limited to the overmodulation of the command voltage based on the switching state-maintaining overmodulation. The overmodulated command voltage generation by the overmodulated command voltage generation unit 20 in accordance with the present disclosure is applied to the overmodulation of the command voltage based on the smallest-distance overmodulation.

When the initial command voltage as received from the higher level controller (not shown) is within the voltage limit, that is, the modulation index is 0.9067 or lower, as illustrated above, the command voltage outputting unit 30 may output the pulse width modulation (PWM) control signal corresponding to the initial command voltage to the inverter 1. The inverter 1 may perform switching operations via the inverting module 13 according to the PWM control signal as received from the command voltage outputting unit 30 and output the AC voltage to the motor 3.

To the contrary, when the initial command voltage as received from the higher level controller (not shown) is outside the voltage limit, that is, the modulation index is greater than 0.9067, the overmodulated command voltage generation unit 20 may overmodulate the command voltage modified using the modulation index modified using the modulation index modifying unit 10 to generates the overmodulated command voltage. Then, the command voltage outputting unit 30 may output a pulse width modulation (PWM) control signal corresponding to the overmodulated command voltage to the inverting module 13. The inverting module 13 may switch according to the PWM control signal received from the command voltage outputting unit 30 and output the AC voltage to the motor 3.

Figure 13:
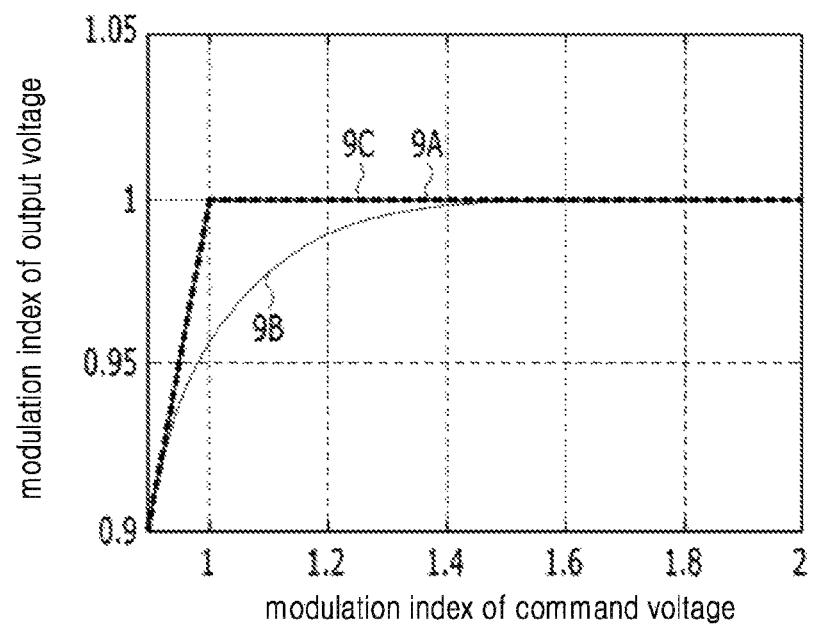
FIG. 13 is an example for checking a performance of the output voltage modulation index achieved by an inverter-controlling device in accordance with an embodiment of the present disclosure.

FIG. 13 is an example graph for checking performance of the output voltage modulation index achieved using the inverter-controlling device of one embodiment of the present disclosure.

In FIG. 13, 9A represents a baseline indicating the linearity. 9B indicates the command voltage modulation index versus output voltage modulation index based on the conventional switching state-maintaining overmodulation. 9C indicates the command voltage modulation index versus output voltage modulation index based on one embodiment of the present disclosure. In FIG. 13, it may be seen that 9A and 9C have the same trace and are superimposed with each other.

As shown in FIG. 13, it may be seen that the linearity between the output voltage of the inverter and the command voltage is ensured because the modulation index line 9C of the output voltage according to an embodiment of the present disclosure is identical with the baseline 9A indicating the linearity.

It will be apparent to those skilled in the art that various modifications and variations may be made in the present invention without departing from the spirit of the present disclosure. The technical scope of the present disclosure is not limited to the contents described in the embodiments but should be determined by the claims and equivalents thereof.

What is claimed is:
1. A device for controlling an inverter,
wherein the inverter includes an inverting module including a plurality of switching elements, wherein the inverting module is configured to receive a direct current (DC) stage voltage and generate an output voltage of three-phases via switching of the plurality of switching elements,
wherein the device includes:
a command voltage outputting unit configured to provide a pulse width modulation (PWM) control signal corresponding to an initial command voltage to the plurality of switching elements of the inverting module when the initial command voltage is within a voltage limit;
a modulation index modifying unit configured to modify a modulation index of the initial command voltage by referring to a modified modulation index table when the initial command voltage is outside the voltage limit; and an overmodulated command voltage generation unit configured to modify the initial command voltage using the modified modulation index to form a modified command voltage and limit the modified command voltage to the voltage limit to generate an overmodulated command voltage, wherein the modified command voltage is determined using a following Equation 1:

$$|V_m^*| = m \times \left(\frac{2}{\pi} V_{dc}\right) \quad \text{[Equation 1]}$$

where m indicates the modulation index of the modified command voltage, $V_{dc}$ indicates the DC stage voltage, $V^*_m$ indicates the modified command voltage, wherein when the initial command voltage is outside the voltage limit, the command voltage outputting unit is configured to inject a PWM control signal corresponding to the overmodulated command voltage to the plurality of switching elements of the inverting module.

2. The device of claim 1, wherein the modulation index modifying unit is further configured to modify the modulation index of the initial command voltage such that a modulation index of an output voltage of the inverting module outputted based on the PWM control signal corresponding to the overmodulated command voltage has a linear relationship with a modulation index of the overmodulated command voltage.

3. The device of claim 1, wherein the overmodulated command voltage generation unit is further configured to generate the overmodulated command voltage from the modified command voltage outside the voltage limit so as to maintain a PWM switching state of the inverting module.

4. The device of claim 3, wherein the overmodulated command voltage generation unit is further configured to generate the overmodulated command voltage by:

when a difference between a maximum value and a median value among modified command voltages is greater than a difference between the median value and a minimum value among the modified command voltages, determining the maximum value as a positive DC stage voltage; or when the difference between the maximum value and the median value among the modified command voltages is smaller than or equal to a difference between the median value and the minimum value, determining the minimum value as a negative DC stage voltage.

5. The device of claim 1, wherein the modified modulation index table comprises a following Table 1:

TABLE 1

| Modulation index of initial command voltage | Modulation index of modified command voltage |
| --- | --- |
| 0.9067 | 0.9067 |
| 0.9233 | 0.9291 |
| 0.9317 | 0.9440 |
| 0.9402 | 0.9621 |
| 0.9487 | 0.9833 |
| 0.9548 | 1.001 |
| 0.959 | 1.016 |
| 0.9655 | 1.041 |
| 0.9704 | 1.063 |
| 0.9756 | 1.092 |
| 0.9797 | 1.119 |
| 0.9836 | 1.151 |
| 0.9869 | 1.182 |
| 0.9895 | 1.214 |
| 0.9915 | 1.242 |
| 0.9932 | 1.274 |
| 0.995 | 1.312 |
| 0.996 | 1.341 |
| 0.997 | 1.375 |
| 0.9977 | 1.406 |
| 0.9981 | 1.423 |
| 0.9984 | 1.443 |
| 0.9988 | 1.473 |
| 0.9991 | 1.500 |
| 0.9993 | 1.521 |
| 0.9995 | 1.548 |
| 0.9996 | 1.574 |
| 0.9997 | 1.592 |
| 0.9998 | 1.627 |
| 0.9999 | 1.635 |
| 1 | 1.7. |

6. The device of claim 1, wherein the voltage limit defines a maximum voltage that the inverting module can output based on a magnitude of an input power to the inverter.

7. The device of claim 6, wherein a line corresponding to the voltage limit is a hexagonal line.

\* \* \* \* \*